US012759355B2

(12) United States Patent
Blankenship

(10) Patent No.: US 12,759,355 B2
(45) Date of Patent: Oct. 13, 2026

(54) SWIVEL HITCH DEVICE

(71) Applicant: M. Wane Blankenship, Cove, OR (US)

(72) Inventor: M. Wane Blankenship, Cove, OR (US)

( * ) Notice: Subject to any disclaimer, the term of this patent is extended or adjusted under 35 U.S.C. 154(b) by 336 days.

(21) Appl. No.: 18/591,050

(22) Filed: Feb. 29, 2024

(65) Prior Publication Data

US 2025/0162362 A1 May 22, 2025

Related U.S. Application Data

(60) Provisional application No. 63/601,241, filed on Nov. 21, 2023.

(51) Int. Cl.

*B60D 1/44* (2006.01)
*B60D 1/02* (2006.01)
*B60D 1/06* (2006.01)

(52) U.S. Cl.

CPC ................. *B60D 1/44* (2013.01); *B60D 1/02* (2013.01); *B60D 1/06* (2013.01)

(58) Field of Classification Search

CPC ............... B60D 1/44; B60D 1/06; D60D 1/02
See application file for complete search history.

(56) References Cited

U.S. PATENT DOCUMENTS 4,417,748 A 11/1983 Dortch
4,610,457 A 9/1986 Harmon
6,712,381 B1 3/2004 Moss
6,851,813 B2 2/2005 Vandenbrink
7,273,222 B2 9/2007 Rampp
8,474,852 B1 * 7/2013 Granados ................. B60D 1/36 280/479.2
11,014,561 B2 5/2021 Gupta
2018/0126811 A1 * 5/2018 Shaffer .................... B60D 1/06

FOREIGN PATENT DOCUMENTS

GB 2529400 A * 2/2016 ........... B60D 1/1565

* cited by examiner

*Primary Examiner* — Vivek D Koppikar
*Assistant Examiner* — Scott Lawrence Strickler
(74) *Attorney, Agent, or Firm* — Brennan, Manna & Diamond, LLC

(57) ABSTRACT

A swivel hitch device is disclosed for viewing an item being towed in the rearview mirror of the towing vehicle. The swivel hitch device comprises a body component that includes a flat bar secured to the vehicle's hitch and having a through-hole. A channel is configured in a semi-circular shape with a plurality of through-holes spaced equi-distance apart. The channel is secured to a receiver tube and engages the flat bar, such that as the flat bar is swiveled side-to-side, the through-holes in the channel and the flat bar align. A removable, vertical pin is then inserted into a through-hole of the flat bar and the aligned through-hole of the channel, to secure the device in a desired position. Thus, the device essentially realigns a towed object to be off-centered, to be visible by the operator of the vehicle in any rearview mirror.

4 Claims, 7 Drawing Sheets

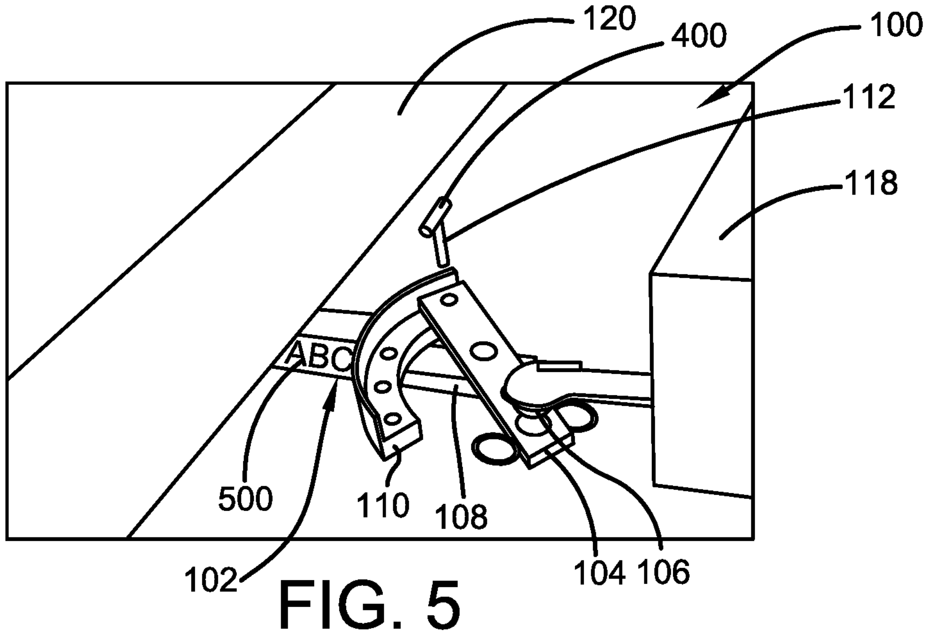

FIG. 5

Providing a swivel hitch device comprising a body component that includes a flat bar, a channel and a receiver tube — 600

↓

Securing the flat bar to a vehicle hitch — 602

↓

Securing the channel and the flat bar to the receiver tube — 604

↓

Swiveling the channel into the desired position and aligning the through-holes in the channel and the flat bar — 606

↓

Inserting a removable pin to secure the channel in position for use — 608

FIG. 6

SWIVEL HITCH DEVICE

CROSS-REFERENCE TO RELATED APPLICATION

The present application claims priority to, and the benefit of, U.S. Provisional Application No. 63/601,241, which was filed on Nov. 21, 2023, and is incorporated herein by reference in its entirety.

FIELD OF THE INVENTION

The present invention relates generally to the field of swivel hitch devices. More specifically, the present invention relates to a swiveling hitch to make it easier for viewing towable items in a vehicle's rearview mirror. Accordingly, the present disclosure makes specific reference thereto the present invention. Nonetheless, it is to be appreciated that aspects of the present invention are also equally applicable to other like applications, devices, and methods of manufacture.

BACKGROUND

By way of background, this invention relates to improvements in swivel hitch devices. Generally, transporting towable items like trailers, boats, etc., via a vehicle hitch can be a difficult and frustrating experience, especially if the towable object is narrow and not fully visible in the driver's rearview mirror. Drivers are responsible for all cargo stored on and towed by a vehicle, and maintaining roadway safety is of paramount importance.

Vehicles come in a variety of forms, including cars, boats, farm machinery, etc. While vehicles can serve any number of functions, especially with known adaptations, one important vehicle function is towing. Towing allows vehicles that may be limited in function to be able to quickly adapt to be able to perform additional functions and/or to have additional utility. However, different-sized vehicles may have difficulty towing objects that are narrow and not fully visible in their mirrors. Thus, if the item being towed is narrower than the towing vehicle, the item cannot be seen, which may cause safety concerns to users.

Accordingly, there is a demand for an improved swivel hitch device that adjusts to different positions, allowing the hitch to offset a towable item. More particularly, there is a demand for a swivel hitch device that installs conventionally and conveniently onto any residential or commercial vehicle.

Therefore, there exists a long-felt need in the art for a swivel hitch device that provides users with a swiveling hitch to make it easier for viewing towable items in a vehicle's rearview mirror. There is also a long-felt need in the art for a swivel hitch device that adjusts to different pin positions via a swivel mechanism, allowing the hitch to offset a towable item with ease. Further, there is a long-felt need in the art for a swivel hitch device that improves roadway safety by ensuring drivers can consistently view the towable item while operating the vehicle. Moreover, there is a long-felt need in the art for a device that installs conventionally and conveniently onto any residential or commercial vehicle for towing. Further, there is a long-felt need in the art for a swivel hitch device that realigns a towed object to be off-centered, such that it is visible by the operator of the vehicle in a rearview mirror. Finally, there is a long-felt need in the art for a swivel hitch device that is manufactured of high-grade steel.

The subject matter disclosed and claimed herein, in one embodiment thereof, comprises a swivel hitch device. The device is a hitch device for viewing an item being towed in the rearview mirror of the towing vehicle. The swivel hitch device comprises a body component that includes a flat bar having opposing ends, with a first end secured to the vehicle's hitch and the opposing second end having a through-hole. Further, the middle portion of the flat bar is secured to a receiver tube via a fixed pin and nylon washer. A channel is configured in a semi-circular shape with a plurality of through-holes spaced equi-distance apart. The channel is secured to the receiver tube and engages the flat bar, such that as the flat bar is swiveled side-to-side, the through-holes in the channel and the flat bar align. A removable, vertical pin is then inserted into a through-hole of the flat bar and the aligned through-hole of the channel, to secure the device in a desired position. Thus, the device essentially realigns a towed object to be off-centered, to be visible by the operator of the vehicle in any rearview mirror. The device is especially useful if the item being towed is narrower than the towing vehicle.

In this manner, the swivel hitch device of the present invention accomplishes all of the foregoing objectives and provides users with a device that makes it easier to view a towed item. The device offsets a towed item. The device can be manufactured of any high-grade steel that meets industry safety standards.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a swivel hitch device. The device is a hitch device for viewing an item being towed in the rearview mirror of the towing vehicle. The swivel hitch device comprises a body component that includes a flat bar having opposing ends, with a first end secured to the vehicle's hitch and the opposing second end having a through-hole. Further, the middle portion of the flat bar is secured to a receiver tube via a fixed pin and nylon washer. A channel is configured in a semi-circular shape with a plurality of through-holes spaced equi-distance apart. The channel is secured to the receiver tube and engages the flat bar, such that as the flat bar is swiveled side-to-side, the through-holes in the channel and the flat bar align. A removable, vertical pin is then inserted into a through-hole of the flat bar and the aligned through-hole of the channel, to secure the device in a desired position. Thus, the device essentially realigns a towed object to be off-centered, to be visible by the operator of the vehicle in any rearview mirror. The device is especially useful if the item being towed is narrower than the towing vehicle.

In one embodiment, the swivel hitch device can be utilized with any suitable residential or commercial vehicle for towing. Specifically, the vehicle can be a car, truck, van, etc., as is known in the art. Further, the swivel hitch device can be secured to any suitable vehicle hitch as is known in the art, such as a ball hitch or a pin hitch, etc. The swivel hitch device allows a vehicle operator to offset the towed item. Thus, the device essentially realigns a towed item to be off-center and thus, visible to the vehicle operator in any rearview mirror.

In one embodiment, the swivel hitch device comprises a body component that provides for the swiveling and offsetting of the towable object/item. The body component includes a flat bar which comprises a top surface, a bottom surface, and opposing first and second ends. The first end is secured to a vehicle's hitch during use of the device. It will be noted that the flat bar and vehicle hitch are operatively connected to each other by suitable techniques as is known in the art, depending on the type of vehicle hitch in use, and thus won't be described as part of this invention. The second opposing end comprises at least one through-hole for accepting a removable pin.

In one embodiment, the body component includes a receiver tube which comprises a top surface, a bottom surface, and opposing first and second ends. Generally, the middle section of the flat bar is secured to the first end of the receiver tube, which comprises a through-hole. Specifically, the flat bar is secured to the receiver tube via a fixed pin and nylon washer, which allows the flat bar to swivel side-to-side against the receiver tube, as needed. Further, the head of the fixed pin is typically a panhead pin, which is welded to the flat bar during use. Then, the flat bar and attached fixed pin are movably secured to the receiver tube, such that a nylon washer is inserted over an end of the fixed pin, which is then threaded through the through-hole on the first end of the receiver tube and secured.

In one embodiment, the body component includes a channel. The channel is configured in a semi-circular shape with a plurality of through-holes spaced equi-distance apart. The channel comprises a top surface, a bottom surface, opposing first and second ends, a back wall, and an open front creating a C-shaped cross-section. The bottom surface of the channel is secured to the top surface of the receiver tube via welding or other suitable securing means. Once in position, the flat bar engages the channel, such that as the flat bar is swiveled side-to-side, the through-holes in the channel and the flat bar align. A removable, vertical pin is then inserted into a through-hole of the flat bar and the aligned through-hole of the channel, to secure the device in a desired off-set position.

In one embodiment, the removable, vertical pin can be any suitable shape and size as is known in the art, as long as the diameter of the through-holes matches the diameter of the removable pin. Further, the removable pin can comprise a removable T-shaped handle or loop handle, or any other ergonomical shape as is known in the art. Once the removable pin is inserted through the aligned through-holes, a cotter pin or other securing pin can be placed within the pin clip holes at the end of the removable pin, to secure the removable pin in place. Thus, the swivel hitch device can be swiveled to a desired position and secured in place via the removable pin. Accordingly, the device realigns the towed object to be off-centered and thus, visible to the vehicle operator in a rearview mirror.

In one embodiment, the swivel hitch device is manufactured of stainless steel, high-carbon steel, tool steel, aluminum, titanium, iron, etc., or any other suitable metal as is known in the art.

In yet another embodiment, the swivel hitch device comprises a plurality of indicia.

In yet another embodiment, a method of offsetting a towable item to ensure drivers can consistently view the towable item while operating the vehicle is disclosed. The method includes the steps of providing a swivel hitch device comprising a body component that includes a flat bar, a channel, and a receiver tube. The method also comprises securing the flat bar to a vehicle hitch. Further, the method comprises securing the channel and the flat bar to the receiver tube. The method also comprises swiveling the channel into the desired position and aligning the through-holes in the channel and the flat bar. Finally, the method comprises inserting a removable pin to secure the channel in position for use.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 5 illustrates a perspective view of one embodiment of the swivel hitch device of the present invention in use in accordance with the disclosed architecture; and FIG. 6 illustrates a flowchart showing the method of offsetting a towable item to ensure drivers can consistently view the towable item while operating the vehicle in accordance with the disclosed architecture.

DETAILED DESCRIPTION OF THE PRESENT INVENTION

Figure 1A:
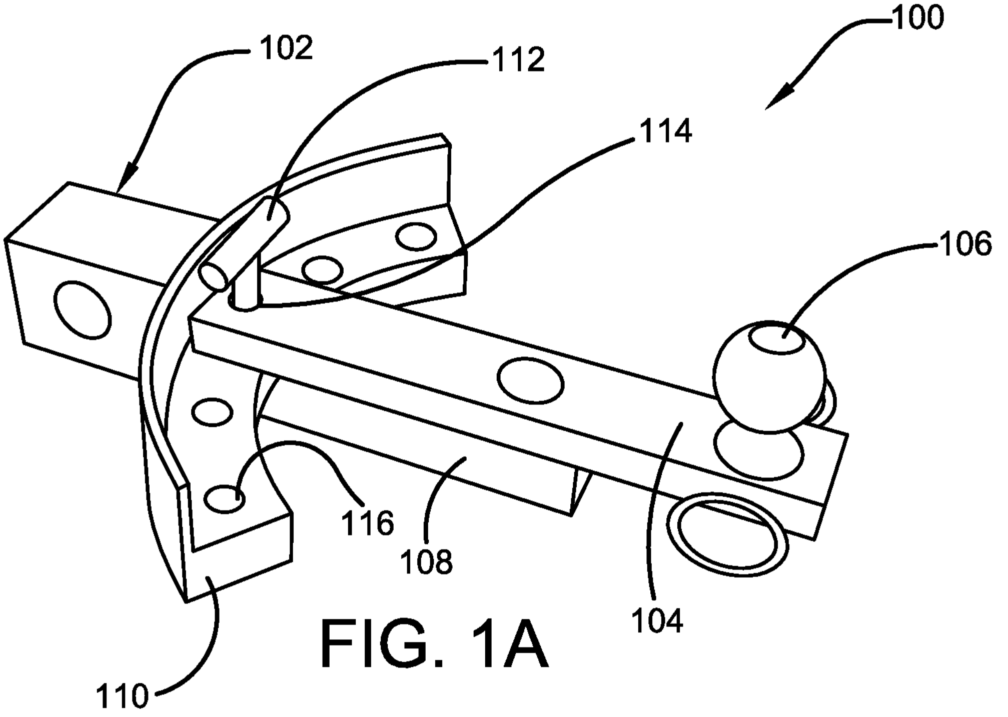
FIGS. 1A-B illustrate a perspective view of one embodiment of the swivel hitch device of the present invention showing the removable pin inserted and removed in accordance with the disclosed architecture.
Figure 1B:
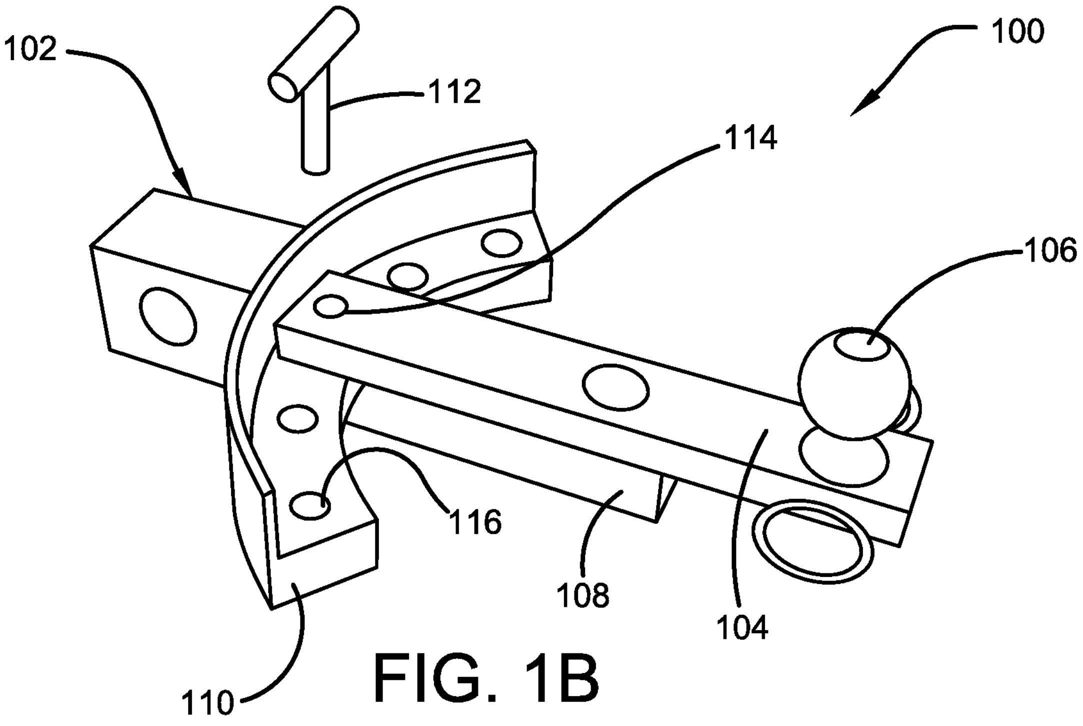

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a swivel hitch device that provides users with a swiveling hitch to make it easier for viewing towable items in a vehicle's rearview mirror. There is also a long-felt need in the art for a swivel hitch device that adjusts to different pin positions via a swivel mechanism, allowing the hitch to offset a towable item with ease. Further, there is a long-felt need in the art for a swivel hitch device that improves roadway safety by ensuring drivers can consistently view the towable item while operating the vehicle. Moreover, there is a long-felt need in the art for a device that installs conventionally and conveniently onto any residential or commercial vehicle for towing. Further, there is a long-felt need in the art for a swivel hitch device that realigns a towed object to be off-centered, such that it is visible by the operator of the vehicle in a rearview mirror. Finally, there is a long-felt need in the art for a swivel hitch device that is manufactured of high-grade steel.

The present invention, in one exemplary embodiment, is a novel swivel hitch device. The device is a hitch device for viewing an item being towed in the rearview mirror of the towing vehicle. The swivel hitch device comprises a body component that includes a flat bar secured to the vehicle's hitch and having a through-hole. A channel is configured in a semi-circular shape with a plurality of through-holes spaced equi-distance apart. The channel is secured to a receiver tube and engages the flat bar, such that as the flat bar is swiveled side-to-side, the through-holes in the channel and the flat bar align. A removable, vertical pin is then inserted into a through-hole of the flat bar and the aligned through-hole of the channel, to secure the device in a desired position. Thus, the device essentially realigns a towed object to be off-centered, to be visible by the operator of the vehicle in any rearview mirror. The present invention also includes a novel method of offsetting a towable item to ensure drivers can consistently view the towable item while operating the vehicle. The method includes the steps of providing a swivel hitch device comprising a body component that includes a flat bar, a channel, and a receiver tube. The method also comprises securing the flat bar to a vehicle hitch. Further, the method comprises securing the channel and the flat bar to the receiver tube. The method also comprises swiveling the channel into the desired position and aligning the through-holes in the channel and the flat bar. Finally, the method comprises inserting a removable pin to secure the channel in position for use.

Referring initially to the drawings, FIGS. 1A-B and 3A-B illustrate a perspective view of one embodiment of the swivel hitch device 100 of the present invention. In the present embodiment, the swivel hitch device 100 is an improved swivel hitch device 100 that provides a user with a means for offsetting a towed object 118, such that the towed object 116 can be viewed in a rearview mirror of the towing vehicle 120. Specifically, the swivel hitch device 100 comprises a body component 102 that includes a flat bar 104 secured to the vehicle's tow hitch 106 and a receiver tube 108. Further, a channel 110 is secured to the receiver tube 108 and engages the flat bar 104, allowing the flat bar 104 to swivel side-to-side. A removable, vertical pin 112 is then inserted into a through-hole 114 of the flat bar 104 and the aligned through-hole 116 of the channel 110, to secure the device 100 in a desired position. Thus, the device 100 essentially realigns a towed object 118 to be off-centered, and thus, visible by the operator of the vehicle 120 in any rearview mirror. The device 100 is especially useful if the item 118 being towed is narrower than the towing vehicle 120.

Generally, the swivel hitch device 100 can be utilized with any suitable residential or commercial vehicle 120 for towing. Specifically, the vehicle 120 can be a car, truck, van, etc., as is known in the art. Further, the swivel hitch device 100 can be secured to any suitable vehicle tow hitch 106 as is known in the art, such as a ball hitch or a pin hitch, etc. The swivel hitch device 100 allows a vehicle operator to offset the towed item 118. Thus, the device 100 essentially realigns a towed item 118 to be off-center and thus, visible to the vehicle operator in any rearview mirror.

Figure 2A:
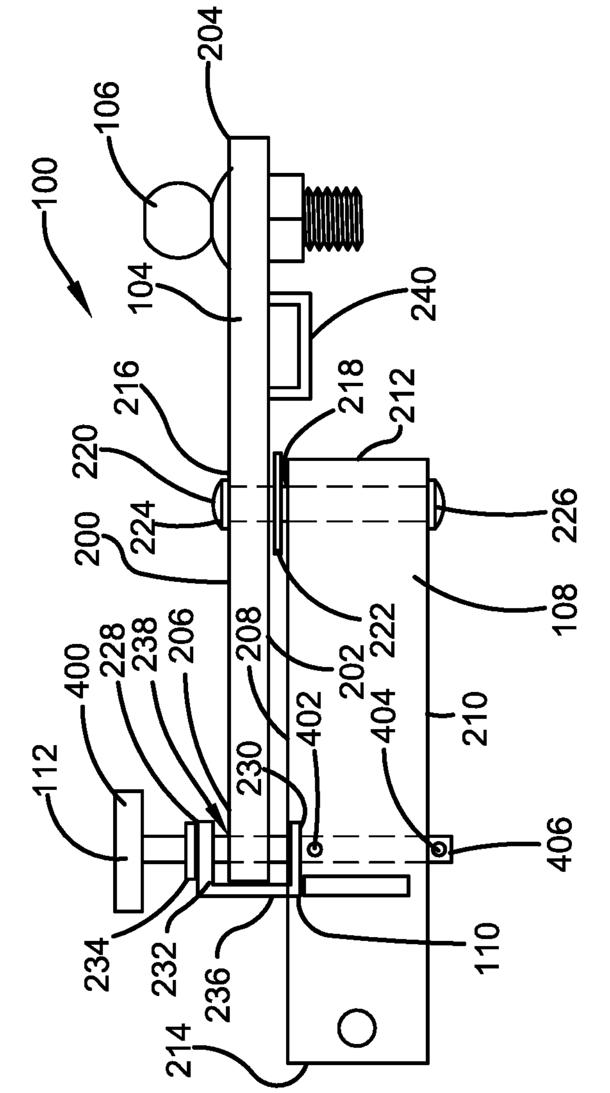
FIGS. 2A-C illustrate a side perspective view of one embodiment of the swivel hitch device of the present invention showing how the device can be manufactured in different lengths in accordance with the disclosed architecture.
Figure 2B:
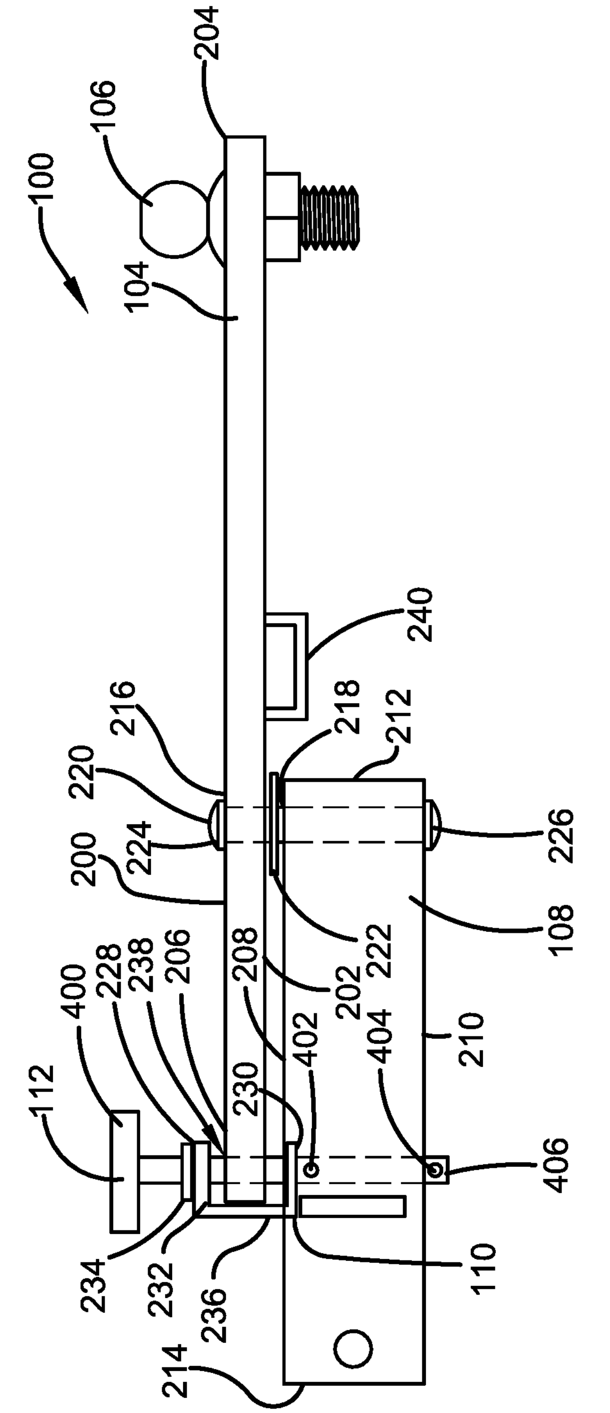
Figure 2C:
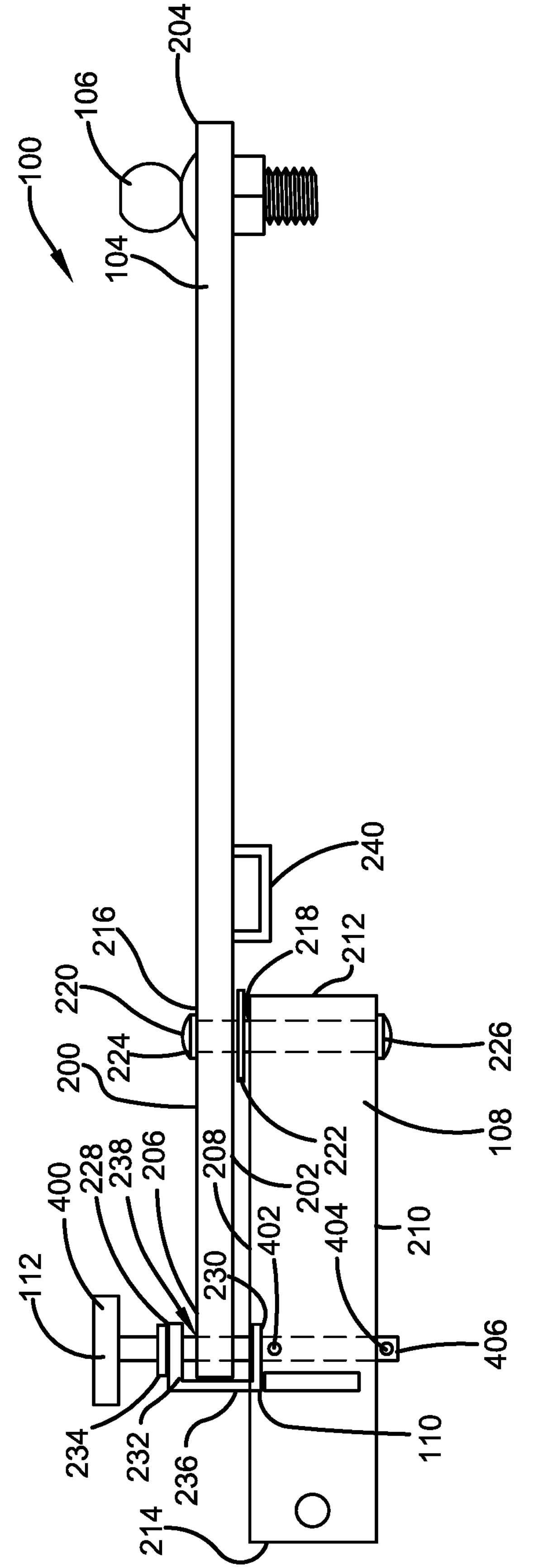
Figure 3A:
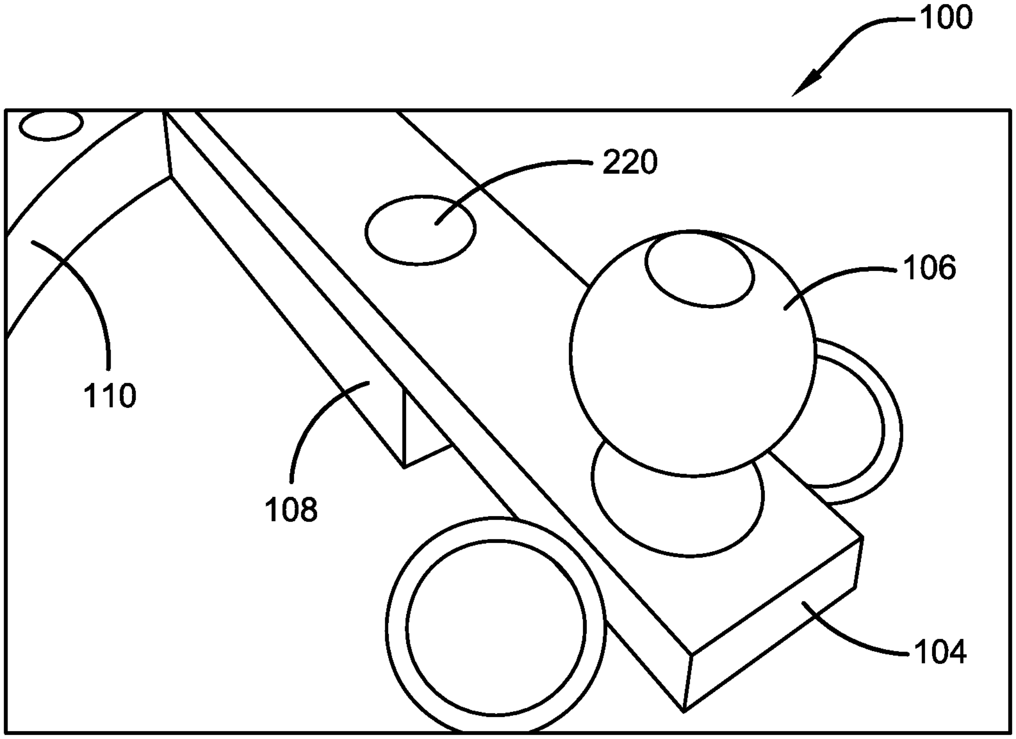
FIGS. 3A-B illustrate a perspective view of one embodiment of the swivel hitch device of the present invention showing the hitch component and the end of the device in accordance with the disclosed architecture.
Figure 3B:
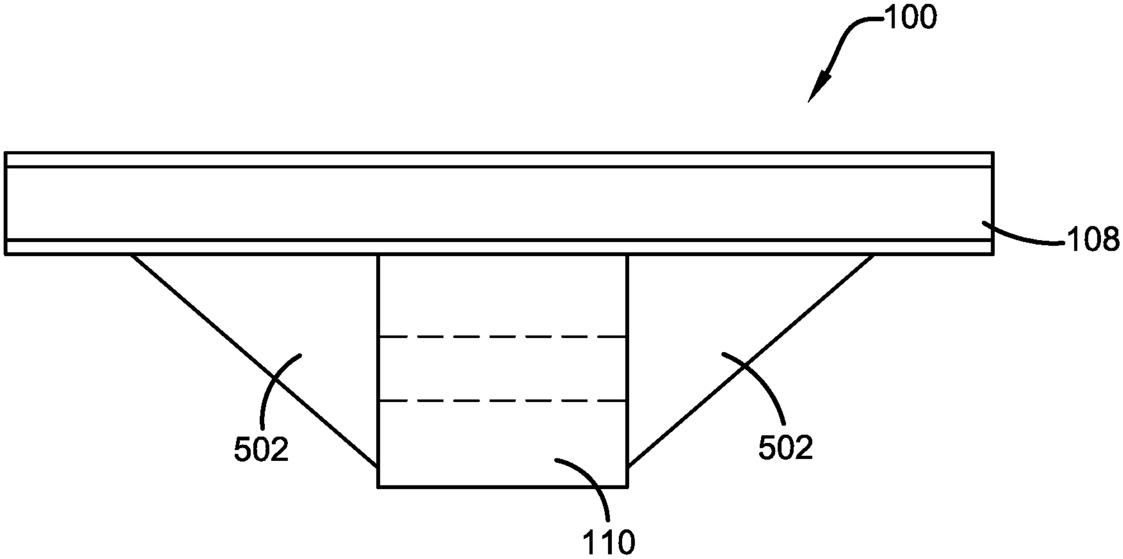

As shown in FIGS. 2A-C, the swivel hitch device 100 comprises a body component 102 that provides for the swiveling and offsetting of the towable object/item 118. The body component 102 includes a flat bar 104 which comprises a top surface 200, a bottom surface 202, and opposing first 204 and second 206 ends. The flat bar 104 is typically ¾" thick×3" wide, or any other suitable measurements as is known in the art. Further, the flat bar 104 can be configured in different lengths, such as 8" from the tow hitch 106, 16" from the tow hitch 106, or 24" from the tow hitch 106, to allow for different angles of pivoting or swiveling with the device 100. Additionally, the first end 204 is secured to a vehicle's tow hitch 106 during use of the device 100. It will be noted that the flat bar 104 and vehicle tow hitch 106 are operatively connected to each other by suitable securing techniques as is known in the art, depending on the type of vehicle tow hitch 106 in use, and thus won't be described as part of this invention. The second opposing end 206 comprises at least one through-hole 114 for accepting a removable pin 112. The removable, vertical pin 112 can be any suitable shape and size as is known in the art, as long as the diameter of the through-hole 114 matches the diameter of the removable pin 112. Specifically, the diameter of the removable pin 112 can be approximately ⅜ to 1½", or any other suitable diameter as is known in the art.

Furthermore, the body component 102 includes a receiver tube 108 which comprises a top surface 208, a bottom surface 210, and opposing first 212 and second 214 ends. The receiver tube 108 is typically 2" in height×2" in width, or any other suitable measurements as is known in the art. Generally, the middle section 216 of the flat bar 104 is secured to the first end 212 of the receiver tube 108, which comprises a through-hole 218. Specifically, the flat bar 104 is secured to the receiver tube 108 via a fixed pin 220 and nylon washer 222, which allows the flat bar 104 to swivel side-to-side against the receiver tube 108, as needed. Further, the head 224 of the fixed pin 220 is typically a panhead pin, which is welded to the flat bar 104 during use. Then, the flat bar 104 and attached fixed pin 220 are movably secured to the receiver tube 108 (with the means of a bottom pan head end of pin 220 or other means suitable), such that a nylon washer 222 is inserted over an end 226 of the fixed pin 220, which is then threaded through the through-hole 218 on the first end 212 of the receiver tube 108 and secured. The fixed pin 220 can be any suitable shape and size as is known in the art, as long as the diameter of the through-hole 218 matches the diameter of the fixed pin 220. Specifically, the diameter of the fixed pin 220 can be approximately ⅜ to 1½", or any other suitable diameter as is known in the art.

Additionally, the body component 102 includes a channel 110. The channel 110 is configured in a semi-circular shape with a plurality of through-holes 116 spaced equi-distance apart. The channel 110 comprises a top surface 228, a bottom surface 230, opposing first 232 and second 234 ends, a back wall 236, and an open front 238 creating a C-shaped cross-section. The channel 110 is typically 1½" in width×1" in height, or 1½" in width×1½" in height for heavy-duty devices, or any other suitable measurements as is known in the art. The bottom surface 230 of the channel 110 is secured to the top surface 208 of the receiver tube 108 via welding or other suitable securing means. Once in position, the flat bar 104 engages the channel 110, such that as the flat bar 104 is swiveled side-to-side, the through-holes 116 in the channel 110 and the flat bar 104 align. A removable, vertical pin 112 is then inserted into a through-hole 114 of the flat bar 104 and the aligned through-hole 116 of the channel 110, to secure the device 100 in a desired off-set position. Further, the device 100 comprises at least one drag chain bar 240 that can be ¼" in measurement.

Figure 4A:
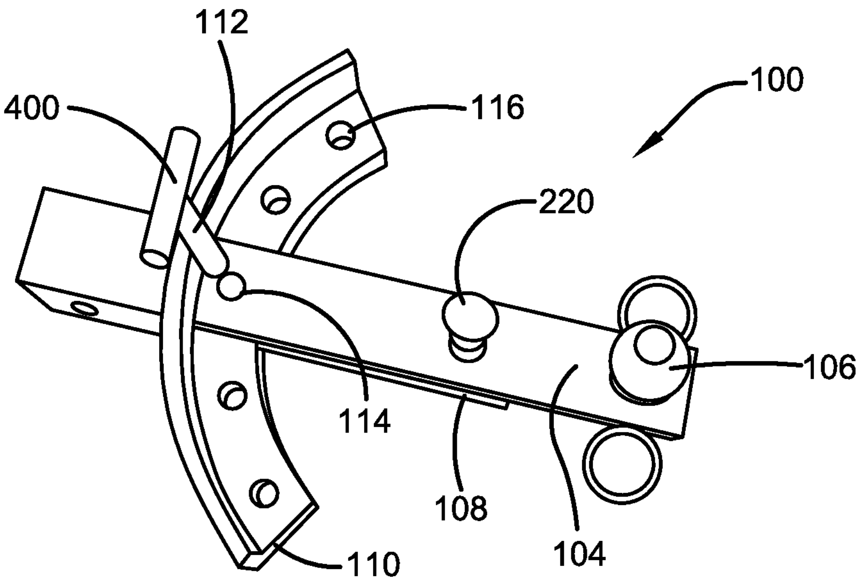
FIGS. 4A-B illustrate a top perspective view of one embodiment of the swivel hitch device of the present invention showing how the device swivels in accordance with the disclosed architecture.
Figure 4B:
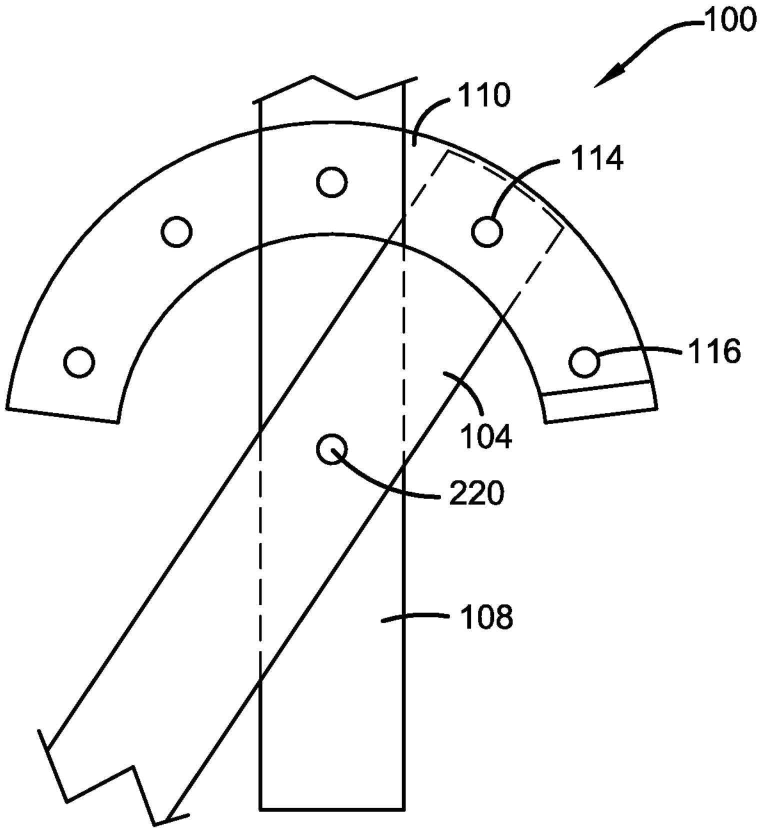

As shown in FIGS. 4A-B, the removable, vertical pin 112 can be any suitable shape and size as is known in the art, as long as the diameter of the through-hole 114 matches the diameter of the removable pin 112. Specifically, the diameter of the removable pin 112 can be approximately ⅜ to 1½", or any other suitable diameter as is known in the art. Further, the removable pin 112 can comprise a removable T-shaped handle 400 or loop handle, or any other ergonomical shape as is known in the art. Once the removable pin 112 is inserted through the aligned through-holes 114, 116, a cotter pin 402 or other securing pin can be placed within the pin clip holes 404 at the end 406 of the removable pin 112, to secure the removable pin 112 in place. Thus, the swivel hitch device 100 can be swiveled to a desired position and secured in place via the removable pin 112. Accordingly, the device 100 realigns the towed object 118 to be off-centered and thus, visible to the vehicle operator in a rearview mirror.

As shown in FIG. 5, the swivel hitch device 100 is manufactured of stainless steel, high-carbon steel, tool steel, aluminum, titanium, iron, etc., or any other suitable metal as is known in the art. Furthermore, in manufacturing, a brace 502 can be welded to a bottom of the channel 110 and receiver tube 108. Then, the base of the channel 110 can be notched to be flush with the receiver tube 108 and welded in place. Thus, the back of the channel 110 is welded to the base and the top of the channel 110 is welded to the back.

In yet another embodiment, the swivel hitch device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be tow hitch, vehicle, or brand related.

FIG. 6 illustrates a flowchart of the method of offsetting a towable item to ensure drivers can consistently view the towable item while operating the vehicle. The method includes the steps of at 600, providing a swivel hitch device comprising a body component that includes a flat bar, a channel, and a receiver tube. The method also comprises at 602, securing the flat bar to a vehicle hitch. Further, the method comprises at 604, securing the channel and the flat bar to the receiver tube. The method also comprises at 606, swiveling the channel into the desired position and aligning the through-holes in the channel and the flat bar. Finally, the method comprises at 608, inserting a removable pin to secure the channel in position for use.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "swivel hitch device", "swivel device", "hitch device", and "device" are interchangeable and refer to the swivel hitch device 100 of the present invention.

Notwithstanding the foregoing, the swivel hitch device 100 of the present invention can be of any suitable size and configuration as is known in the art without affecting the overall concept of the invention, provided that it accomplishes the above-stated objectives. One of ordinary skill in the art will appreciate that the swivel hitch device 100 as shown in FIGS. 1-6 is for illustrative purposes only, and that many other sizes and shapes of the swivel hitch device 100 are well within the scope of the present disclosure. Although the dimensions of the swivel hitch device 100 are important design parameters for user convenience, the swivel hitch device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A swivel hitch device that provides a user with a means for offsetting a towed object, such that the towed object can be viewed in a rearview mirror, the swivel hitch device comprising:

a body component;

wherein the body component includes a flat bar secured to a vehicle's tow hitch and a receiver tube;

wherein the body component includes a channel secured to the receiver tube and which engages the flat bar;

wherein the flat bar swivels side-to-side and is secured in a desired position;

wherein the flat bar can be secured to a ball hitch or a pin hitch;

wherein the flat bar comprises a top surface, a bottom surface, and opposing first and second ends;
wherein the flat bar is configured in different lengths, such as 8, 16, or 24" from the vehicle's tow hitch;
wherein the first end of the flat bar is secured to the vehicle's tow hitch during use;
wherein the second opposing end of the flat bar comprise at least one through-hole for accepting a removable pin;
wherein the removable pin comprises a removable T-shaped handle;
wherein the receiver tube comprises a top surface, a bottom surface, and opposing first and second ends;
wherein a middle section of the flat bar is secured to the first end of the receiver tube, which comprises a through-hole;
wherein the flat bar is secured to the receiver tube via a fixed pin and nylon washer, which allows the flat bar to swivel side-to-side against the receiver tube, as needed;
wherein the channel is configured in a semi-circular shape with a plurality of through-holes spaced equi-distance apart; and
further wherein the flat bar realigns the towed object to be off-centered, and thus, visible by a vehicle operator in the rearview mirror.

2. The swivel hitch device of claim 1, wherein the channel comprises a top surface, a bottom surface, opposing first and second ends, a back wall, and an open front creating a C-shaped cross-section.

3. The swivel hitch device of claim 2, wherein a bottom surface of the channel is secured to a top surface of the receiver tube via welding.

4. The swivel hitch device of claim 3, wherein the flat bar engages the channel, such that as the flat bar is swiveled side-to-side, the through-holes in the channel and the flat bar align and a removable pin is then inserted into a through-hole of the flat bar and the aligned through-hole of the channel, to secure the swivel hitch device in a desired off-set position.

* * * * *